(12) United States Patent
Hoffmann et al.

(10) Patent No.: US 9,718,345 B2
(45) Date of Patent: Aug. 1, 2017

(54) DUMP TRUCK OR TRUCK

(71) Applicant: Liebherr-Mining Equipment Colmar SAS, Colmar (FR)

(72) Inventors: Sebastien Nicolas Hoffmann, Colmar (FR); Kai Kugelstadt, Lahr (DE); Burkhard Richthammer, Freiburg (DE); Klaus Graner, Biberach/Riss (DE)

(73) Assignee: Liebherr-Mining Equipment Colmar SAS, Colmar (FR)

( * ) Notice: Subject to any disclaimer, the term of this patent is extended or adjusted under 35 U.S.C. 154(b) by 1 day.

(21) Appl. No.: 14/730,516

(22) Filed: Jun. 4, 2015

(65) Prior Publication Data

US 2015/0352944 A1    Dec. 10, 2015

(30) Foreign Application Priority Data

Jun. 5, 2014 (DE) .................. 10 2014 008 477

(51) Int. Cl.

| | |
|---|---|
| *B60K 11/06* | (2006.01) |
| *B60K 6/20* | (2007.10) |
| *B60K 11/04* | (2006.01) |
| *B60P 1/04* | (2006.01) |
| *F01P 5/04* | (2006.01) |
| *B60K 6/46* | (2007.10) |
| *F01P 1/06* | (2006.01) |
| *F01P 1/00* | (2006.01) |

(52) U.S. Cl.
CPC ............... *B60K 11/06* (2013.01); *B60K 6/20* (2013.01); *B60K 11/04* (2013.01); *B60P 1/04* (2013.01); *F01P 5/04* (2013.01); *B60K 6/46* (2013.01); *B60Y 2200/142* (2013.01); *F01P 1/06* (2013.01); *F01P 2001/005* (2013.01); *Y02T 10/6217* (2013.01); *Y10S 903/904* (2013.01)

(58) Field of Classification Search
CPC .......... B60K 11/08; B60K 11/00; B60K 11/02
See application file for complete search history.

(56) References Cited

U.S. PATENT DOCUMENTS

| | | | |
|---|---|---|---|
| 6,142,213 A | 11/2000 | Gallivan et al. | |
| 7,537,072 B2 * | 5/2009 | Sturmon | B60K 11/08 165/51 |
| 7,678,014 B2 * | 3/2010 | Nohara | B60K 6/445 475/5 |
| 2012/0020811 A1 | 1/2012 | Kraeutler et al. | |

FOREIGN PATENT DOCUMENTS

| | | |
|---|---|---|
| DE | 887917 B | 8/1953 |
| DE | 19538899 A1 | 4/1997 |
| DE | 69814003 T2 | 1/2004 |

(Continued)

OTHER PUBLICATIONS

Liebherr-International Deutschland GmbH, Product Brochure: "Mining Truck—T284," Aug. 2012, 24 pages.

*Primary Examiner* — John Walters
*Assistant Examiner* — James Triggs
(74) *Attorney, Agent, or Firm* — McCoy Russell LLP

(57) ABSTRACT

The present disclosure relates to a dump truck or to a truck, comprising a diesel electric traction drive and a cooling system, wherein two radiator fans and/or cooler blowers of the cooling system are hydraulically driven.

16 Claims, 3 Drawing Sheets

(56) References Cited

FOREIGN PATENT DOCUMENTS

| | | | |
|---|---|---|---|
| DE | 102004028354 | A1 | 1/2006 |
| DE | 102010031835 | A1 | 1/2012 |
| DE | 102011114354 | B3 | 11/2012 |
| EP | 1607600 | A1 | 12/2005 |
| GB | 1239568 | A | 7/1971 |
| GB | 2495180 | B | 1/2014 |

* cited by examiner

DUMP TRUCK OR TRUCK

CROSS REFERENCE TO RELATED APPLICATION

This application claims priority to German Patent Application No. 10 2014 008 477.9, entitled "Dump Truck or Truck" filed on Jun. 5, 2014, the entire contents of which is hereby incorporated by reference in its entirety for all purposes.

TECHNICAL FIELD

The present disclosure relates to a mobile work machine, in particular in the form of a dump truck or of a truck, comprising a diesel electric traction drive and a cooling system.

BACKGROUND AND SUMMARY

Dump trucks or so-called large dump trucks are predominantly used in coal mining operations or ore mining operations for the transport of the mined coal, minerals and ores. These bulk material dumpers are manufactured in sizes of more than 90 metric tons (t) up to several 100 t in weight and payload so that they have very large dimensions overall.

A diesel electric drive is used as the traction drive, wherein the mechanical energy generated by a diesel engine is converted with the aid of a generator into electrical energy for the supply of the electric traction drives. The reason for this procedure is that diesel engines, like all internal combustion engines, can only be operated with ideal efficiency in a very restricted speed range and cannot be started under load. The AC motors for the driving axle which are used can also produce the desired torque in the lower speed range for starting. The internal combustion engine used can be operated continuously in the ideal speed range.

Previously, all auxiliary consumers of the vehicle have been electrically driven; thus, for example, all components for the operation of a cooling air-based cooling system of the work machine. The energy supply of the motorized components of the cooling system has previously been provided by the generator of the diesel electric drive. It is a disadvantage of this procedure that different voltage circuits have to be produced for the different auxiliary consumers. For this purpose, at least one further power electronics module is required in addition to the power electronics for the control of the electrical traction drive, the further power electronics providing a suitable DC voltage circuit for the feeding of any auxiliary consumers such as blower motors, etc.

It is the object of the present disclosure to show an innovative concept for the energy supply of the auxiliary consumers of a mobile work machine of the category.

This object is achieved by a mobile work machine having a diesel electric traction drive and a cooling system for the cooling of any system components. The required components for the provision of the cooling system will be termed auxiliary consumers in the following.

In accordance with the present disclosure, at least the auxiliary consumers of the cooling system, i.e., at least two radiator fans and/or cooling blowers of the cooling system, which are configured as radial fans, are hydraulically driven. The radiator fans or cooling blowers accordingly each comprise hydraulic motors which are associated with them and which can be supplied by a hydraulic circuit having the required pressure. In accordance with the present disclosure, the radiator fans and/or cooler blowers are now no longer electrically supplied by the provided energy of the generator, but are instead hydraulically driven.

The radiator fans serve the sucking in of the cooling air, while the cooling fans serve to control the cooling air flow within the flow passages.

The present disclosure results in a simplification of the power electronics since previously necessary components of the power electronics for providing a separate DC voltage circuit for the supply of the electrical fan motors can be dispensed with. The manufacture and maintenance of the power electronics is simplified and less expensive. The hydraulic drive of the fan motors and/or blower motors is in contrast characterized by a higher stability and reliability, which proves to be a great advantage particularly with work machines in the form of dump trucks due to the extreme environmental conditions at the deployment site. In addition, an operation of the fan motors and/or blower motors can be ensured practically independently of the operating conditions of the internal combustion engine.

In an example embodiment of the present disclosure, the generated electricity of the diesel electric traction drive serves only the feed of the one or more traction drive motors. The supply of all further auxiliary consumers, in particular each and every consumer of the cooling system, is implemented by the integration of one or more hydraulic circuits.

The required hydraulic energy for feeding the hydraulic motors for the radiator fans or for the cooling blowers is provided by one or more hydraulic pumps. The drive of the hydraulic pumps advantageously takes place via at least one transfer case which can be flanged either directly to the internal combustion engine, for example via a belt connection, or alternately on the outgoing engine shaft at the internal combustion engine or at the incoming or outgoing side at the generator. It is important in this embodiment that the internal combustion engine drives the generator directly, in particular by a shaft passing through the transfer case, so that any transmission losses of the drive train between the internal combustion engine and the generator are very largely avoided. A defined portion of the engine torque is branched off via the transfer case to drive the hydraulic pumps. Alternatively, one or more hydraulic pumps can also be connected directly to the internal combustion engine via a belt connection.

In an example embodiment of the present disclosure, the utilized hydraulic drive of the respectively associated radiator fan or cooling fan is operable at a fixed or variable speed. The setting of the required speed can in particular be set independently of the operating point of the internal combustion engine or of the generator.

The respectively used radiator fan is a radial fan which is driven by at least one hydraulic motor.

In an example embodiment of the present disclosure, one or more air guidance passages run in the direction of the one or more electric drives, i.e., in the direction of the electric motors of the driven vehicle axle, in particular, the rear axle, and/or in the direction of one or more components of the power electronics of the diesel electric drive, in particular frequency inverters, and/or to the generator of the diesel electric drive itself. Sufficient cooling air can be conveyed in the direction of the components to be cooled by means of one or more cooling fans within the air guidance passages so that a sufficient cooling is achieved.

The radiator fans or the radial fans are in particular arranged, viewed in the direction of travel, behind an upper deck of the work machine and/or above or on the generator of the diesel electric drive.

Further advantages and properties of the present disclosure will be explained in more detail with reference to an embodiment shown in the drawings.

DETAILED DESCRIPTION

Figure 1:
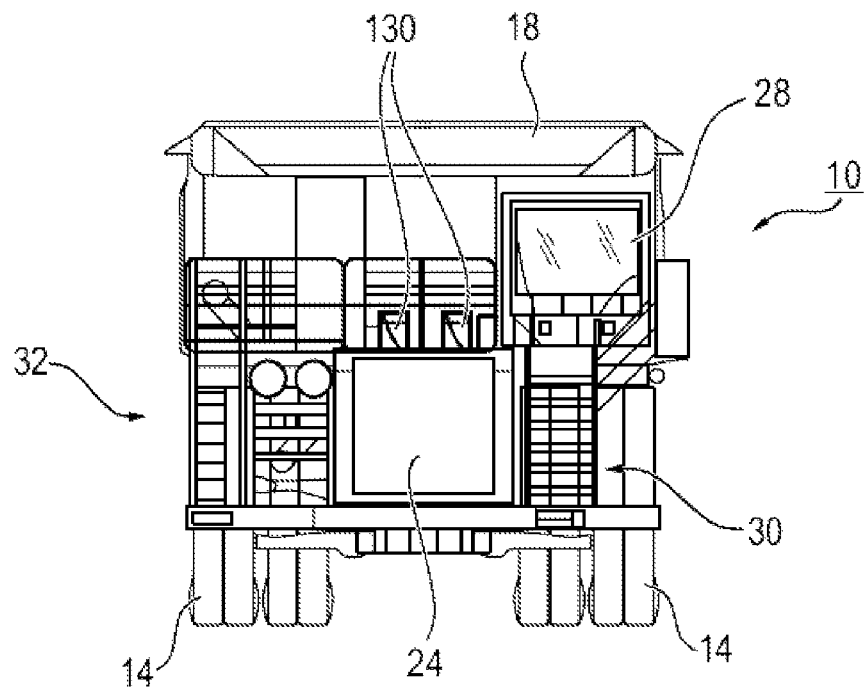
FIG. 1 shows an example of the dump truck embodiment in accordance with the present disclosure.
Figure 2:
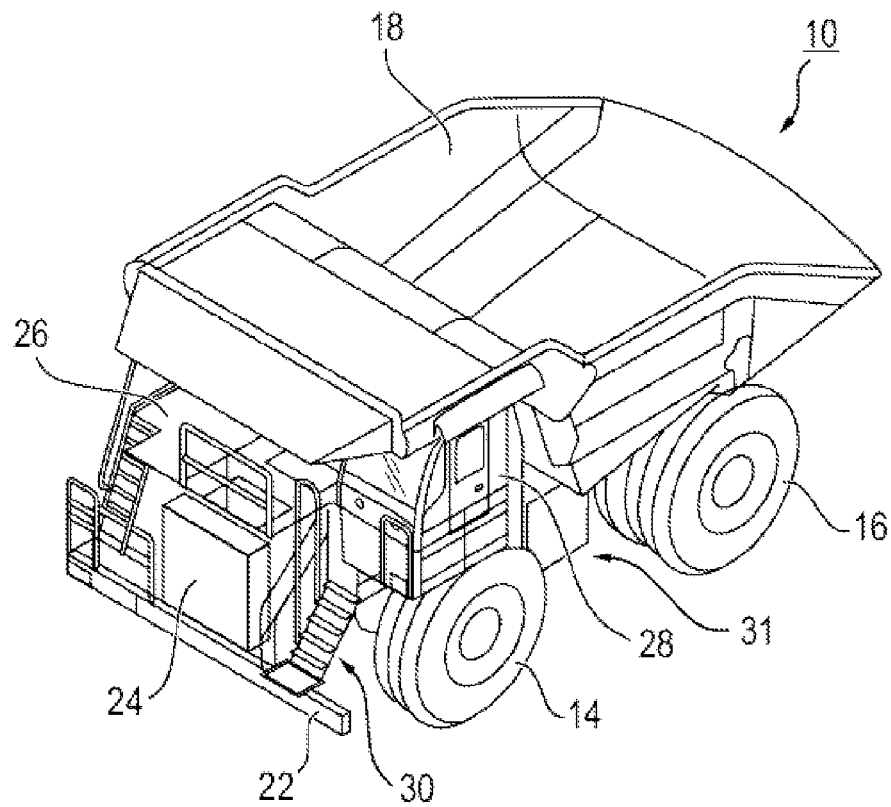
FIG. 2 shows further detail of the embodiment of FIG. 1.
Figure 3:
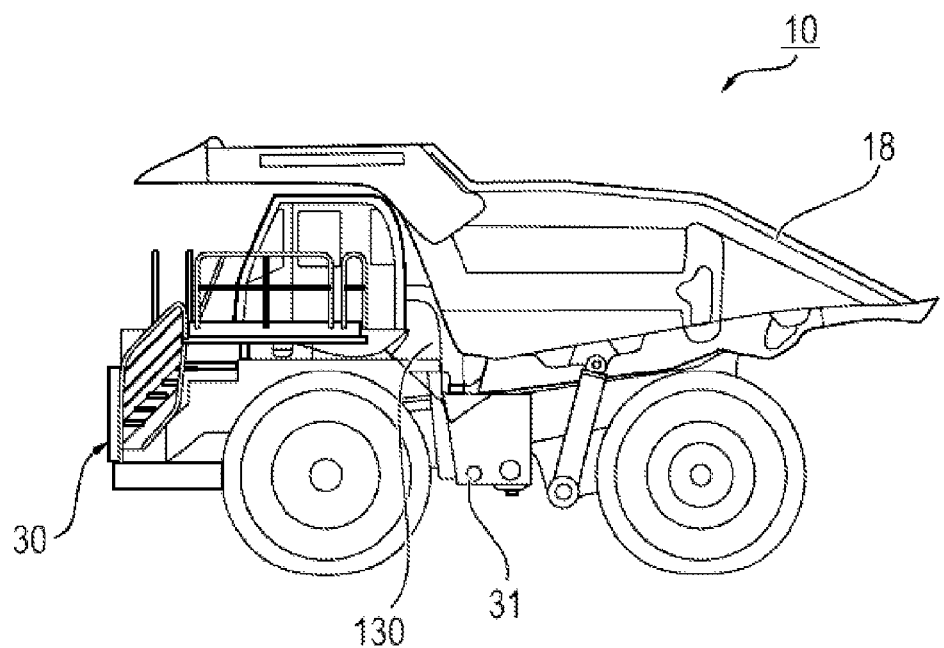
FIG. 3 shows further detail of the embodiment of FIG. 1.
Figure 4:
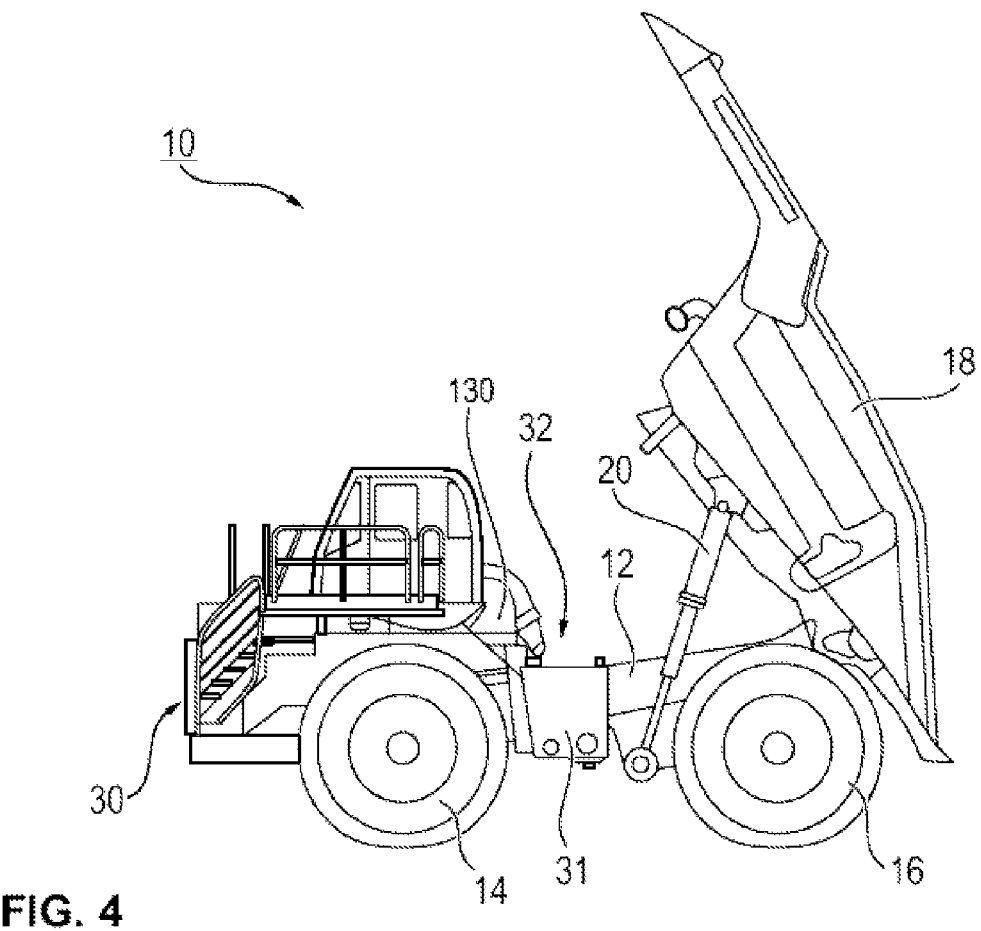
FIG. 4 shows further detail of the embodiment of FIG. 1.

A dump truck 10 is shown in FIGS. 1 to 4. It is here a so-called large dump truck such as is used in ore mines. Front wheels 14 and rear wheels 16, driven via electric motors not shown in more detail, are supported at a rigid frame 12. The rear wheels 16 are designed with dual tires.

A skip 18 is pivotally connected to the frame 12 and is pivotable via hydraulic lifting cylinders 20 provided at both sides at the vehicle. The vehicle is bounded by the bumper 22 in the region of the vehicle 10 at the front in the direction of travel. A radiator module 24 is arranged above the bumper 22. An upper deck 26 on which an operator's cabin 28 is arranged in turn extends over the width of the dump truck 10 above the radiator module 24. In the embodiment shown here, the operator's cabin 28 is positioned at the side of the upper deck 26 at the left in the direction of travel. The operator's cabin thus lies above the front left wheel 14.

Figure 5:
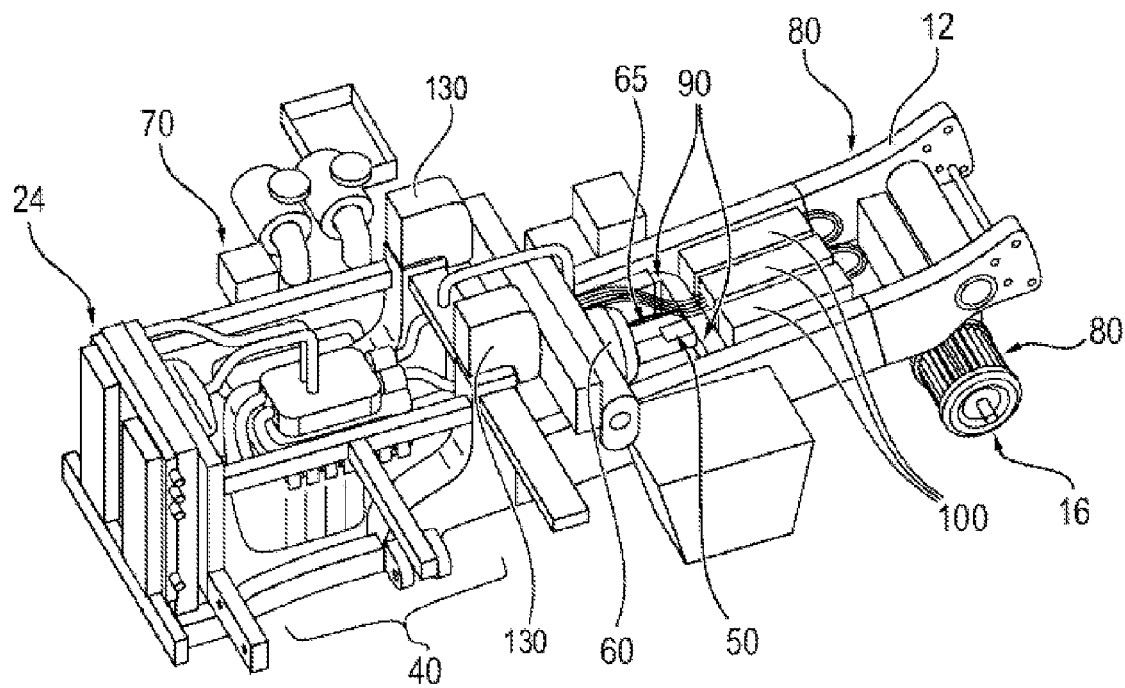
FIG. 5 shows a perspective detailed view of the vehicle frame of the dump truck in accordance with the present disclosure.

The dump truck 10 comprises a dielectric drive which is easily recognizable in the perspective detailed view of the vehicle frame 12 in FIG. 5. The drive comprises the diesel engine 40 which is mounted in the front region of the vehicle frame 12 viewed in the direction of travel. The internal combustion engine 40 is in particular seated in the region of the front axle 14 beneath the upper deck 26 and the operator's cabin 28. The radiator module 24 is seated directly in front of the internal combustion engine 40 at the vehicle front.

The internal combustion engine 40 drives the generator 60 mechanically to generate the required electrical energy for the electrical traction drives. Two AC motors 80, which are integrated to the left and right in the rear axle 16, serve as the traction drive. Power electronics 100 with the required power components such as, for example, frequency converters, etc. are available for the control or regulation of the electric motors 80 and of the generator 60.

An air cooling circuit inter alia serves the cooling of the generator 60, of the power electronics 100 and of the electric motors 80. The cooling air is sucked in by two radial fans 130 which are mounted, viewed in the direction of travel, behind the upper deck 26 above the generator 60 and are in particular arranged centrally in the transverse direction. The sucked-in air is supplied via air passages to the generator 60, to the power electronics 100 and to the electric motors 80 and to the planetary gears of the driven rear axle 16. The radial fans 130 are not fed electrically, but rather each comprise at least one hydraulic motor which is acted on by the required hydraulic pressure via a hydraulic circuit.

For this purpose, one or more hydraulic pumps are driven as auxiliary consumers via the transfer case 50. In the embodiment shown, a hydraulic pump 65 is additionally driven by the shaft passing through the generator 60.

Figure 6:
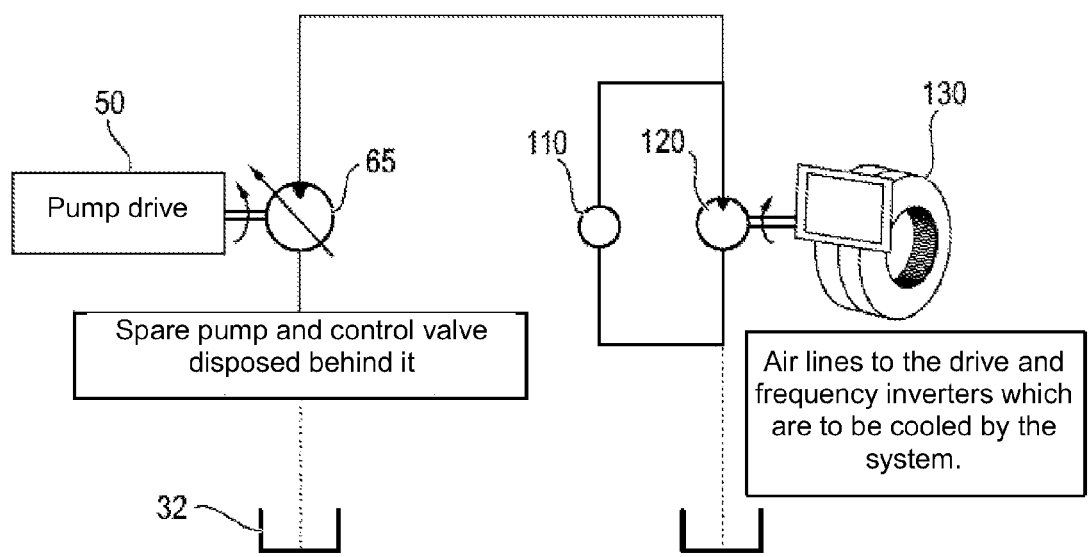
FIG. 6 shows a sketched schematic representation of the hydraulic circuit for the energy supply of at least one fan of the cooling circuit.

A schematic representation of the hydraulic circuit can be seen from FIG. 6. The hydraulic pump 65 is driven mechanically, by way of example, via the transfer case 50. It pumps the hydraulic oil from the hydraulic tank 32 to the hydraulic motor 120 which generates the rotary movement of the radial fan 130. The hydraulic medium conveyed to the motor 120 is subsequently led back to the tank 32. The hydraulic motor 120 is secured by the check valve 110.

The hydraulic pump 65 is designed as variable to control the blower speed so that the speed of the blower motor 120 can be set variably. An additional pump as well as a control valve can be connected upstream or downstream of the hydraulic pump 65.

Due to the use in accordance with the present disclosure of hydraulic motors as radiator fan motors, additional components of the power electronics 100 for the design of an electric circuit for the supply of electrical blower motors can be dispensed with. The power electronics 100 used thereby have a considerably simpler design. Furthermore, the speed of the blower motors 120 can be set independently of the operating point of the internal combustion engine 40 or of the generator 60.

In addition to the air cooling, a cooling liquid circuit, in particular a common cooling circuit for cooling the generator 60 and/or the power electronics 100 and/or the electric motors 80 and/or the transmission oil of the planetary gears can also be provided. Required hydraulic pumps are then likewise driven via the transfer case 50.

In one example, a method may comprise operating a dump truck having a diesel electric traction drive and a cooling system, wherein the cooling system includes a radiator blower with two radial fans each driven via a hydraulic motor. During vehicle operation, such as driving of the vehicle along the ground with the vehicle moving, the diesel engine drives the traction motor to generate electrical power via a generator to drive the traction motors, the traction motors driving wheels to propel the vehicle along the ground. Also during this same vehicle operation, the diesel engine also drives a hydraulic system to generate hydraulic pressure to drive the fans via the hydraulic motor. The fans may blow cooling air through the vehicle system, including cooling the engine and/or traction motors. The fans are not coupled to the electrical system nor do they utilize any electric power from the generator.

The invention claimed is:

1. A dump truck or truck comprising: a diesel electric traction drive and a cooling system, wherein the cooling system includes a radiator blower that has two radiator fans which are radial fans or cooling blowers, each driven via a hydraulic motor, and wherein the hydraulic motors are operable for driving the radiator fans or the cooling blowers at a fixed or variable speed, and wherein required hydraulic energy is provided by one or more hydraulic pumps which are driven via at least one transfer case at an internal combustion engine or at a generator.

2. The dump truck or truck in accordance with claim 1, wherein generated electricity of the diesel electric traction drive serves only for a feed of traction drive motors.

3. The dump truck or truck in accordance with claim 1, wherein a speed of the hydraulic motors of the radiator fans or the cooling blowers is set variably independently of a speed of the internal combustion engine.

4. The dump truck or truck in accordance with claim 1, wherein the radiator fans or the cooling blowers convey air via air guidance passages to electric motors of a driven vehicle axle.

5. The dump truck or truck in accordance with claim 4, wherein the radiator fans or the cooling blowers convey air via air guidance passages to one or more planetary gears of the driven vehicle axle.

6. The dump truck or truck in accordance with claim 4, wherein the radiator fans or the cooling blowers convey air via air guidance passages to one or more components of power electronics, including frequency inverters.

7. The dump truck or truck in accordance with claim 4, wherein the radiator fans or the cooling blowers convey air via air guidance passages to a generator of the diesel electric traction drive.

8. The dump truck or truck in accordance with claim 1, wherein the radiator fans are arranged, viewed in a direction of travel, behind an upper deck of a work machine or above or on a generator of the diesel electric traction drive.

9. The dump truck or truck in accordance with claim 1, wherein the radiator fans are arranged, viewed in a direction of travel, behind an upper deck of a work machine and above or on a generator of the diesel electric traction drive.

10. A method of operating a truck comprising:
    operating a diesel electric traction drive and a cooling system of the truck, including driving wheels of the truck via traction drives, wherein the cooling system includes a radiator blower that has two radiator fans which are radial fans or cooling blowers, each driven via a hydraulic motor, where no components of the cooling system are driven electrically via electrical power generated by the traction drives, and wherein the hydraulic motors drive the radiator fans or the cooling blowers at a fixed or variable speed, adjusting the hydraulic motors at speeds different from a speed of an internal combustion engine, and
    wherein the radiator fans or the cooling blowers convey air via air guidance passages to electric motors of a driven vehicle axle during vehicle operation while traction motors drive the wheels of the truck to propel the truck along a path.

11. The method of claim 10, wherein generated electricity of the diesel electric traction drive serves only for a feed of traction drive motors, and wherein required hydraulic energy for the cooling system is provided by one or more hydraulic pumps which are driven via at least one transfer case at a diesel engine or at a generator.

12. The method of claim 10, wherein the radiator fans or the cooling blowers convey air via air guidance passages to one or more planetary gears of the driven vehicle axle.

13. The method of claim 12, wherein the radiator fans or the cooling blowers convey air via air guidance passages to one or more components of power electronics, including frequency inverters.

14. The method of claim 10, wherein the radiator fans or the cooling blowers convey air via air guidance passages to a generator of the diesel electric traction drive.

15. The method of claim 10, wherein the radiator fans are arranged, viewed in a direction of travel, behind an upper deck of a work machine or above or on a generator of the diesel electric traction drive.

16. The method of claim 10, wherein the radiator fans are arranged, viewed in a direction of travel, behind an upper deck of a work machine and above or on a generator of the diesel electric traction drive.

\* \* \* \* \*